(12) United States Patent
Mott

(10) Patent No.: US 10,870,517 B2
(45) Date of Patent: Dec. 22, 2020

(54) SMART CLOSURE WITH KEYPAD OR BIOMETRICS

(71) Applicant: Nicholas Evan Mott, San Jose, CA (US)

(72) Inventor: Nicholas Evan Mott, San Jose, CA (US)

( * ) Notice: Subject to any disclaimer, the term of this patent is extended or adjusted under 35 U.S.C. 154(b) by 0 days.

(21) Appl. No.: 15/946,734

(22) Filed: Apr. 6, 2018

(65) Prior Publication Data

US 2020/0247589 A1    Aug. 6, 2020

(51) Int. Cl.
| | |
|---|---|
| *G08B 21/00* | (2006.01) |
| *B65D 41/04* | (2006.01) |
| *A61J 1/03* | (2006.01) |
| *G06K 9/00* | (2006.01) |
| *H04W 4/80* | (2018.01) |

(52) U.S. Cl.
CPC ............ *B65D 41/0471* (2013.01); *A61J 1/03* (2013.01); *G06K 9/00885* (2013.01); *B65D 2215/00* (2013.01); *B65D 2255/00* (2013.01); *H04W 4/80* (2018.02)

(58) Field of Classification Search
CPC .... B65D 41/0471; A61J 1/03; G06K 9/00885
USPC .................................................. 340/539.12
See application file for complete search history.

(56) References Cited

U.S. PATENT DOCUMENTS

| | | | |
|---|---|---|---|
| 3,850,328 A | 11/1974 | Guala | |
| 6,382,416 B1 * | 5/2002 | Gainey | A61J 1/1437 206/1.5 |
| 7,193,514 B2 | 3/2007 | Ritson | |
| 7,382,692 B1 * | 6/2008 | Hildebrandt | A61J 7/0472 200/572 |
| 2006/0071011 A1 * | 4/2006 | Varvarelis | A61J 7/0481 221/9 |
| 2009/0223994 A1 | 9/2009 | Getz | |
| 2010/0169111 A1 * | 7/2010 | Brue | G06F 19/00 705/2 |
| 2010/0270257 A1 * | 10/2010 | Wachman | G06F 19/3462 215/228 |
| 2014/0074283 A1 * | 3/2014 | Blackburn | A61J 7/0076 700/237 |
| 2014/0130453 A1 * | 5/2014 | Shalala | B65B 7/28 53/420 |
| 2015/0232235 A1 | 8/2015 | Lloyd | |
| 2015/0291344 A1 * | 10/2015 | Macvittie | A61J 7/0472 221/13 |

* cited by examiner

*Primary Examiner* — Mark S Rushing
(74) *Attorney, Agent, or Firm* — Patrick Reilly

(57) ABSTRACT

This disclosure relates generally to a smart closure for any container that has lock/unlock features, and can be accessed using keypad or biometrics, also including RFID, Bluetooth, or wireless control and communication. This can also include monitoring solutions, with data logging. For example, time of access, temperature, weight, or other environmental conditions. The closure and container assembly present a positive lock mechanism designed to provide an affirmative indication that full closure has been attained.

10 Claims, 5 Drawing Sheets

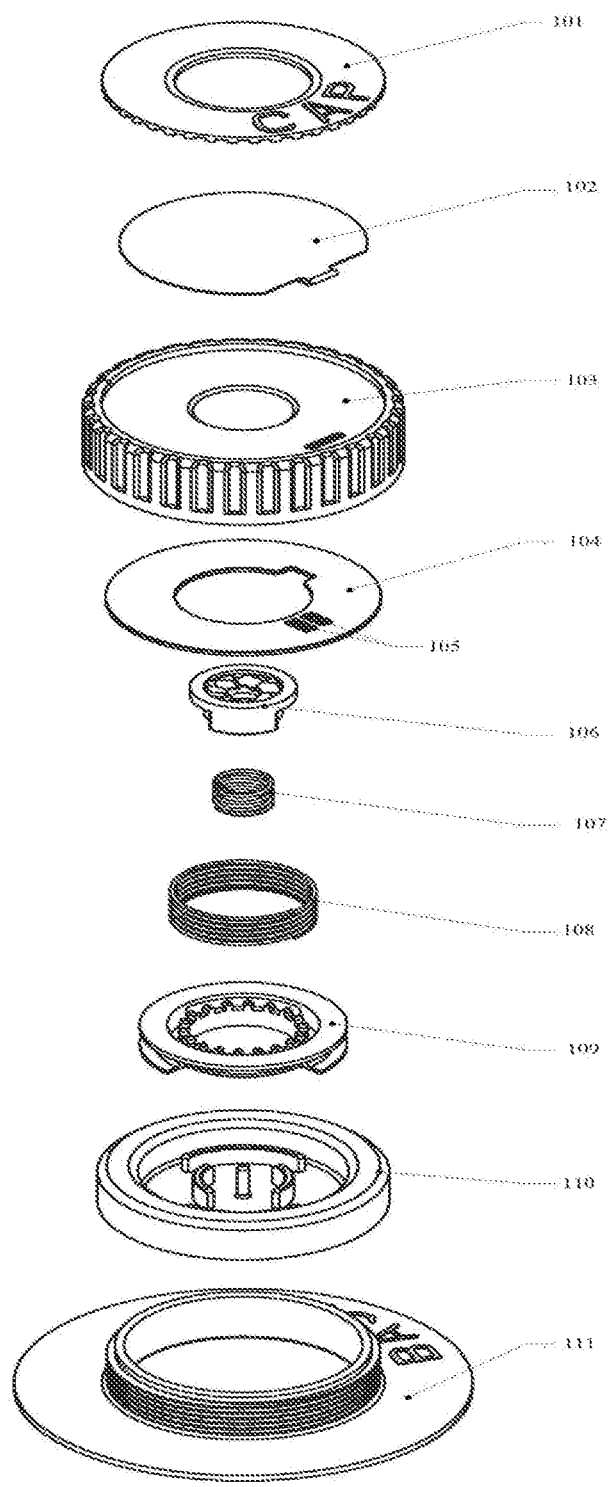
Fig: 01

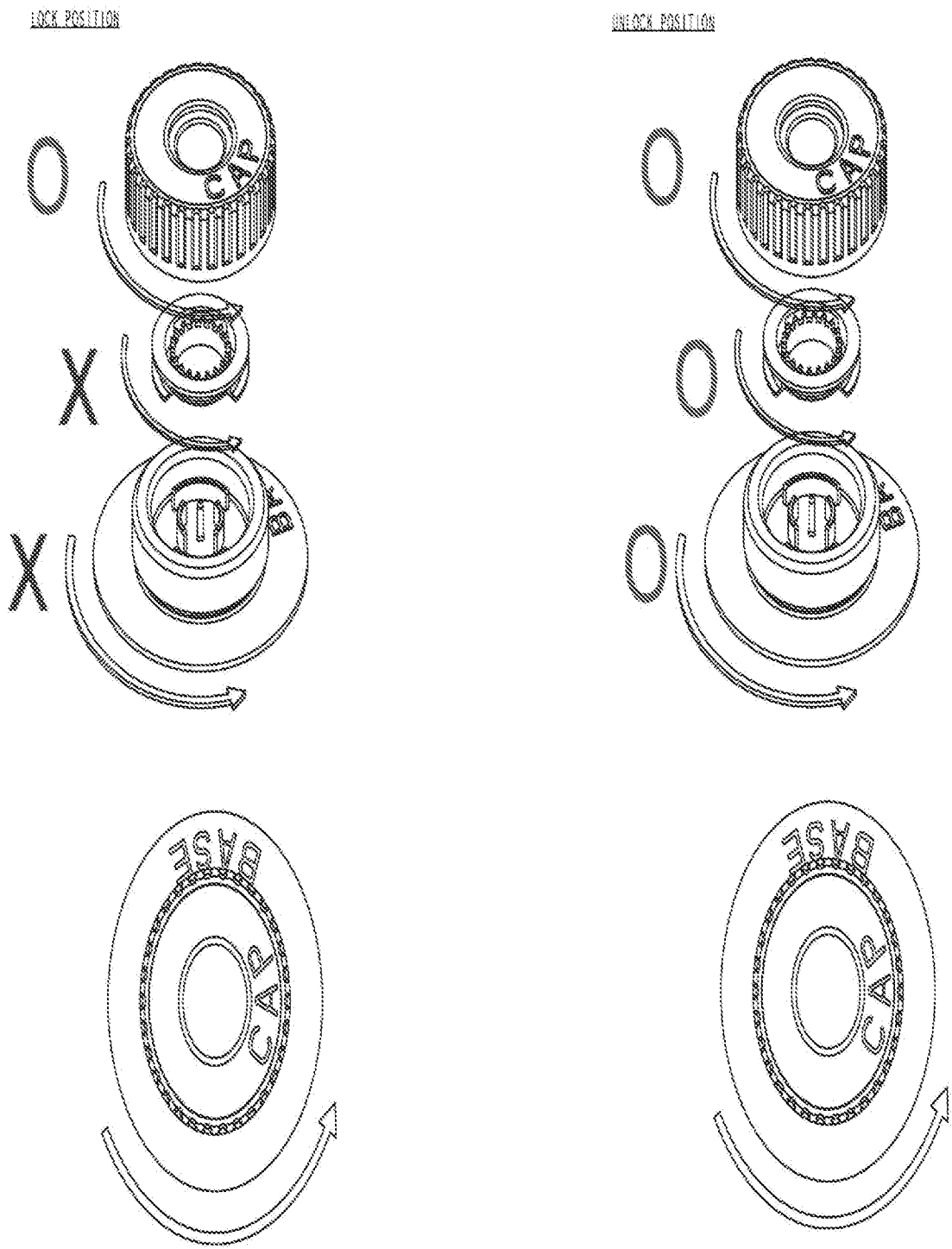
Fig: 02

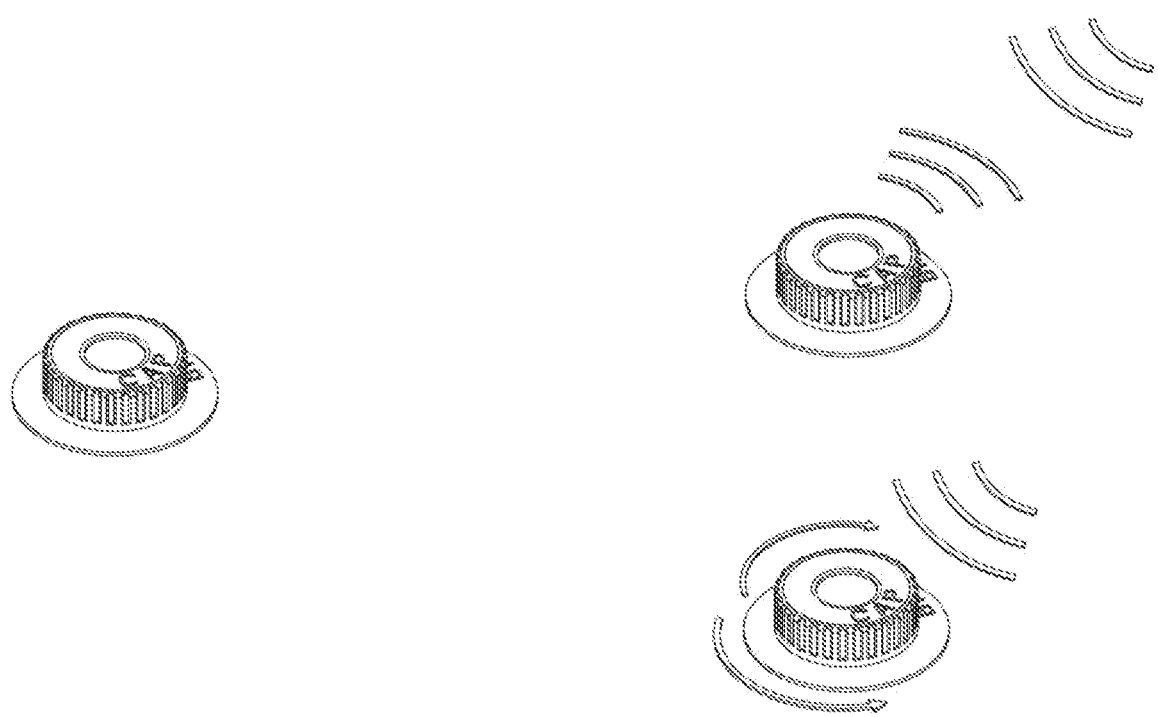
Fig: 03

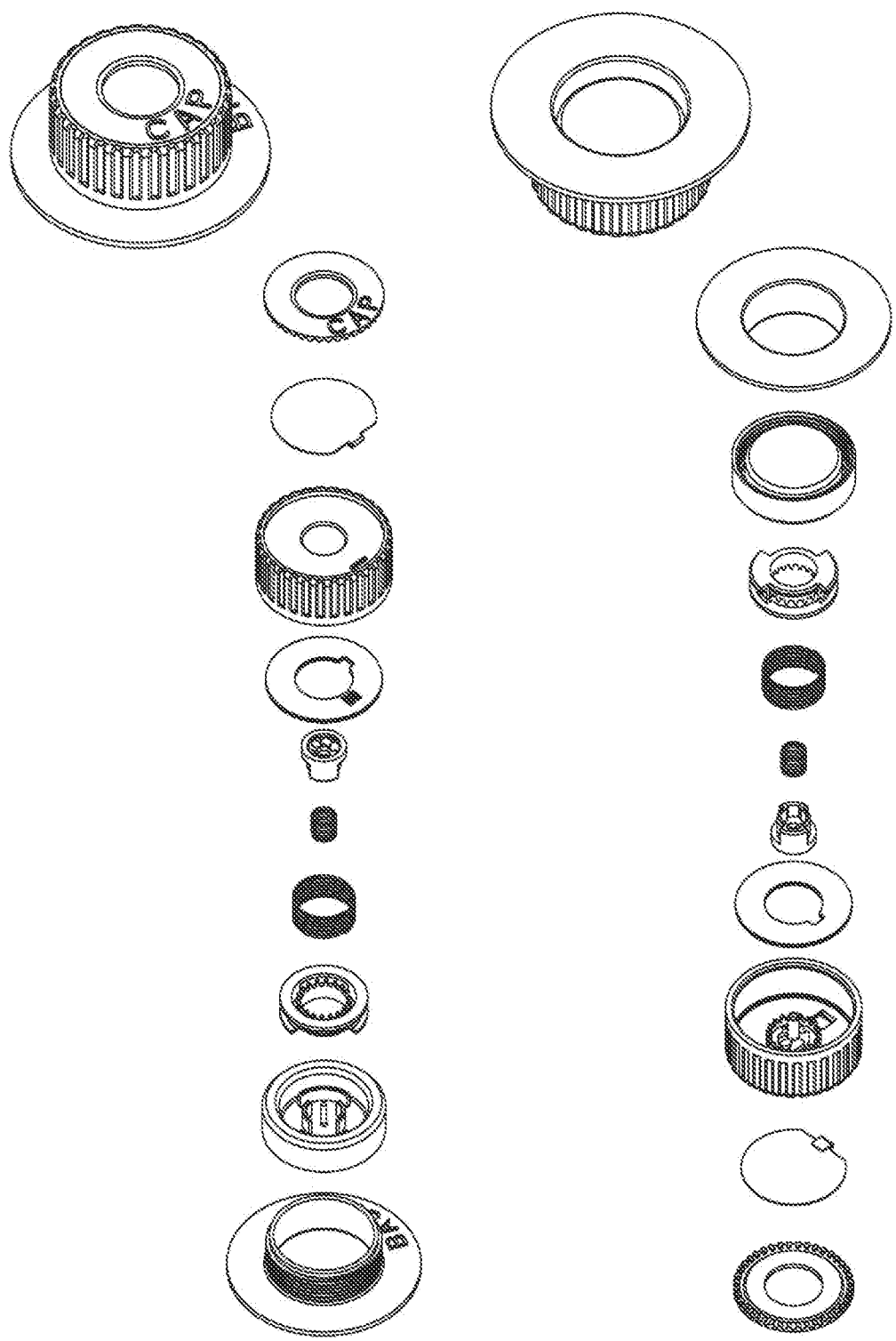
Fig: 04

SMART CLOSURE WITH KEYPAD OR BIOMETRICS

BACKGROUND

Field of the Invention

The present invention relates to a Smart closure for any container that has lock/unlock features, and can be accessed using keypad or biometrics, also including RFID, Bluetooth, or wireless control and communication. This can also include monitoring solutions, with data logging. For example, time of access, temperature, weight, or other environmental conditions.

Aspects of the present invention relate more particularly to smart caps for medication containers, and more particularly, some embodiments relate to smart cap systems and methods for a medication container.

Description of the Related Art

Bottles, containers and other receptacles containing hazardous or volatile materials, or materials which react with air, are used for different purposes in locations such as chemical and biochemical laboratories, industries and hospitals. At times, a user, such as a scientist, may fail to recap a bottle or container after use, resulting in the escape of hazardous materials such as gases or vapors into the atmosphere resulting in harm to the user and the environment. Often such gases can reach toxic levels when permitted to flow out of a container for an extended time period.

GlowCap® is a universal bottle cap that provides a series of escalating audio and visual alerts to remind patients to take their medication. The GlowCap® syncs directly through a mobile broadband network using a local hub. If a patient forgets to take a prescribed medication, he or she may be sent a text message through the mobile network. The GlowCap® has limited mobility as it only works in the presence of a mobile network a hub, and is carrier specific. Additionally, it needs its own data connection and is costly.

CleverCap® is a universal bottle cap that is programmed to time release tablets. Audio, visual, and mobile reminders may be delivered. The main short shortcomings of Clever-Cap® are its large size, price, and lack of scale.

There are many types of child resistant closure systems described in the art. An example of a particular type of child resistant closure system is proposed in U.S. Pat. No. 5,449,078, which relates to a combination of a container and safety cap. While many child resistant caps effectively provide protection against the danger of small children being able to remove potentially harmful contents, e.g. pills, from vials or other containers, they also provide a problem for a considerable portion of the adult population that require medication but lack the manual dexterity or strength to remove the child resistant cap. This is of a particular concern to the elderly population or people suffering from arthritis and other disabling diseases.

However, to Applicant's knowledge, none of these prior art methods have been found to be completely suitable to meet these needs and are cumbersome and non-durable. Hence, the inventor of the present invention proposes to resolve and surmount existent technical difficulties related to lock/unlock features and to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

According to a first embodiment the invention is a Smart closure for any container and can be locked/unlocked using keypad or biometrics, also including RFID, Bluetooth, or wireless control and communication. This can also include monitoring solutions, with data logging.

Another object of the invention relates to Smart closure with built-in wireless connectivity, data log in, biometric, RFID, Infrared, NEC and data logging with environment sensing and assessment.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 shows the exploded view of the closure.

FIG. 2 shows the lock/unlock mechanism of the closure.

FIG. 3 shows the compact design of the closure and wireless connectivity and key card access.

FIG. 4 shows the comprehensive design of the closure.

Figure 5C:
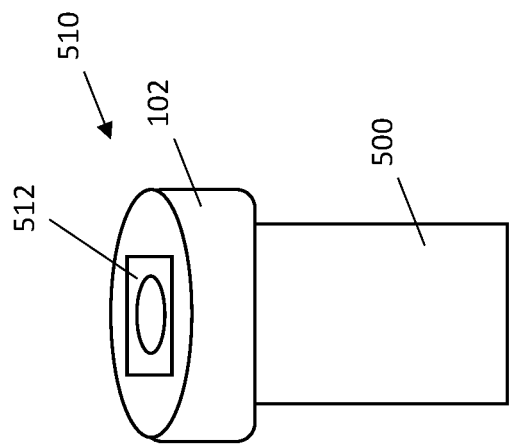
FIGS. 5A through 5C are diagrams representing three preferred embodiments of the invented device that respectively include a keypad, a touch screen, and a biometric sensor.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Considering the advances the concept is Smart closure for any container that has lock/unlock features, and can be accessed using keypad or biometrics, also including RFID, Bluetooth, or wireless control and communication. This can also include monitoring solutions, with data logging. For example, time of access, temperature, weight, or other environmental conditions.

The first component on the top of the closure in FIG. 01 is cap cover 101 which can be made up of variety of materials i.e. polymers, composites, ceramics, glass and with other variety of options. The cap cover has cap enclosure 103 which is to protect from environment and is decorative made up from variety of materials i.e. polymers, composites, ceramics, glass and with other variety of options. Below the cap is a smart module 102 which can be made up of PCB's or metal coils the smart module ensures wireless connectivity, data logging, biometric protection, environment sensing and protection, child safety features, position tracking, key card access and other device settings. Below the smart module is electromagnet 104 with electrodes 105 that serves as an actuator for toggling cap between locked and unlocked state. The electromagnet helps to engage and disengage open key with cap enclosure. Below which is a close key 106 for turning and closing the cap. There is also a spring 107 attached to maintain the engagement between close key and cap enclosure, and also there is a spring for open key 108 for resetting open key position. The open key is engaged with cap enclosure when cap is unlocked for opening. To fasten or unfasten there is a threaded cap body 109 with a threaded container opening 110.

FIG. 02 shows the lock and unlock mechanism. Close key 106 and Cap enclosure 103 is disconnected to achieve lock position. However, to lock Close key 106 and Cap enclosure 103 is engaged to lock the closure.

It is to be understood that the smart enclosure with positive lock mechanism provided in accordance with the present invention can be formed of any suitable material such as plastic or metal or a combination of materials and the like and that the invention is not intended to be limited by the material from which the parts are formed.

Figure 5B:
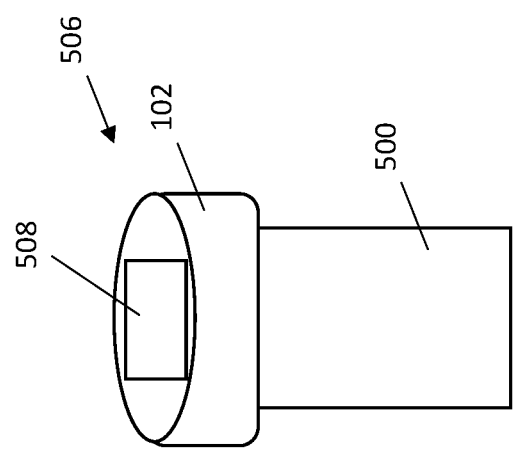
Figure 5A:
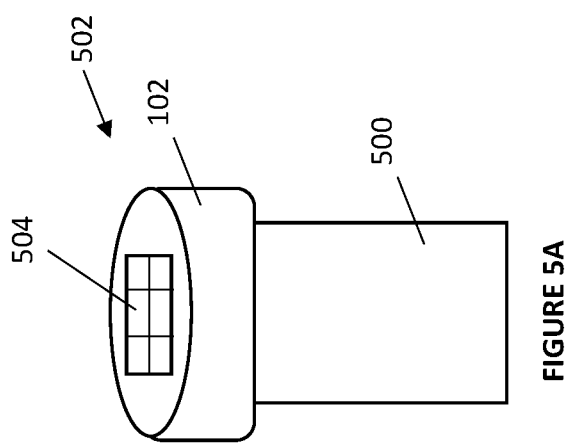

Referring now generally to the Figures and particularly to FIGS. 5A through 5C, FIGS. 5A through 5C are diagrams representing four preferred embodiments of the invented device that respectively include a keypad, a touch screen, and a biometric sensor. In FIG. 5A is presented a container 500 capped with a first invented cap 502. As a point of reference, the cap enclosure 102 of the first invented cap 502 is also labeled. This first invented cap 502 includes a keypad 504. In FIG. 5B is presented the container 500 capped with a second invented cap 506 that has a touch screen 508. In FIG. 5C is presented the container 500 capped with a third invented cap 510 that has a biometric scanner 512 such as a fingerprint scanner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A Smart Closure Cap (hereinafter, "the cap") shaped to fit over the opening of a container, the cap comprising:
   a cap enclosure with a cap cover and an inner body;
   a means for locking and unlocking the cap comprising:
      an open key that fits in an open key slot;
      a close key that fits in a close key slot; and
      at least one spring to maintain engagement between the close key slot and the cap enclosure, such that insertion of the open key into the open key slot causes the cap to unlock and prevent the open key from being removed, and insertion of the close key into the close key slot causes the cap to reset to a locked position and allow removal of the open key; and
   a smart module coupled with the means for locking and unlocking the cap, the smart module comprising:
      a CPU,
      a memory, and
      a means for enabling a user to operate the smart module comprising one or more of the following: keypad, biometrics, RFID, Bluetooth, or wireless control and communication.

2. The cap of claim 1, wherein the means for operating the smart module comprises or includes a touch screen with a biometric sensor.

3. The cap of claim 1, wherein the means for operating the smart module comprises or includes a keypad.

4. The cap of claim 1, wherein the means for operating the smart module comprises or includes a wireless electronic communication connection.

5. The cap of claim 1, wherein the means for locking and unlocking the cap includes or comprises an electromagnetic actuator operatively controlled by the smart module.

6. The cap of claim 1, further comprising one or more sensors for gathering sensor input information positioned on the outside of the cap enclosure and communicatively coupled to the smart module.

7. The cap of claim 6, wherein the sensor input information from the one or more sensors on the outside of the cap is a factor in controlling locking or unlocking of the cap.

8. The cap of claim 1, further comprising one or more sensors gathering sensor input information positioned on the inside of the cap enclosure and communicatively coupled to the smart module.

9. The cap of claim 8, wherein the sensor input information from the one or more sensors on the inside of the cap is logged in the memory of the smart module.

10. The cap of claim 1, shaped to provide a one way snap fit assembly between the cap enclosure and the inner body.

* * * * *